April 3, 1951 R. L. SMITH 2,547,417
THERMOSTATIC CONTROL SYSTEM FOR FURNACES
Filed March 18, 1948 3 Sheets-Sheet 1

Inventor:
Roland L. Smith

April 3, 1951  R. L. SMITH  2,547,417
THERMOSTATIC CONTROL SYSTEM FOR FURNACES
Filed March 18, 1948  3 Sheets-Sheet 2

NON AUTOMATIC OR MANUALLY OPEN POSITION

CLOSED AUTOMATIC POSITION

Inventor
Roland L. Smith
by Emery Booth, Townsend, Snider and Lurideman Attys

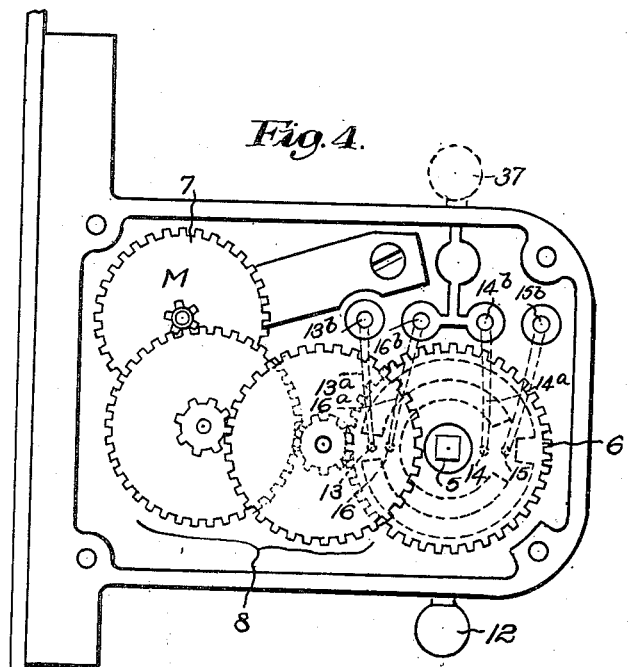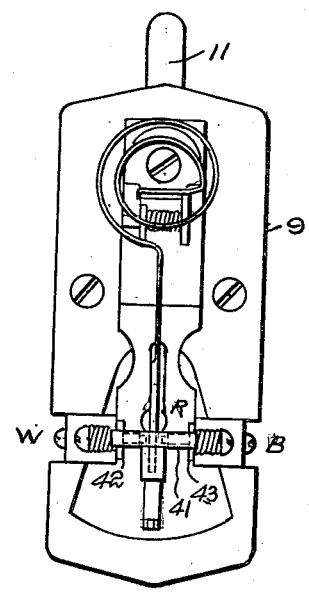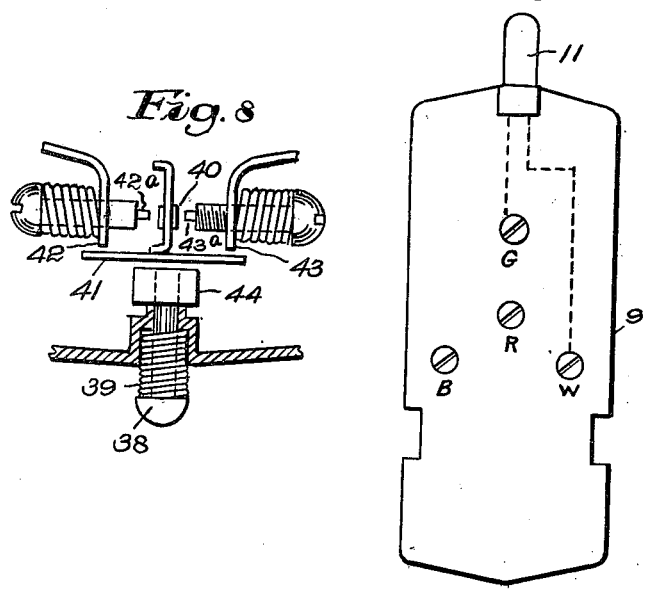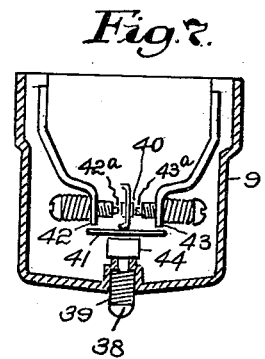

Patented Apr. 3, 1951

2,547,417

UNITED STATES PATENT OFFICE 2,547,417

THERMOSTATIC CONTROL SYSTEM FOR FURNACES

Roland L. Smith, Belmont, Mass., assignor to Crown Controls Company, Inc., New Bremen, Ohio, a corporation of Ohio Application March 18, 1948, Serial No. 15,705

5 Claims. (Cl. 236—16)

This invention relates to thermostatic control systems for furnaces, particularly but not exclusively of the solid fuel type.

In order that the principle of the invention may be readily understood, I have disclosed a single embodiment thereof in the accompanying drawings, wherein Fig. 1 is a front elevation showing the thermostat control unit which is preferably located upon the first floor of a single house or a second or third story of a two or three-family house, and also showing the casing enclosing the damper motor and the rotary contact switch, which parts are adjacent the furnace in the cellar and the connections therefrom to the dampers of the furnace, the manual damper-control switch being shown in normal automatic position with drafts closed, because of the position of the thermostatic control;

Fig. 4 is a side elevation of the casing having the side thereof removed to show the damper motor assembly including the rotary contact switch and the gearing connecting the same, which assembly as a whole I refer to as the damper motor unit;

Fig. 5 is a front elevation of the thermostat with the casing thereof removed to show the manual means for modifying or supplementing the normal thermostatic control to suit individual requirements as desired;

Fig. 6 is a rear elevation of the thermostat to show the four binding posts and the wiring to the signal light;

Fig. 7 is a vertical transverse section of the lower part of the structure shown in Fig. 5; and Fig. 8 is a detail of the same parts shown in Fig. 7, but upon a larger scale.

Many single dwellings, apartments and other buildings are now equipped with a thermostatic control system particularly intended for the automatic control of a solid fuel furnace which is provided with the usual dampers controlled by a thermostat in an electrical circuit having adjacent to or mounted above the furnace a damper motor unit and containing also a rotary switch member geared thereto, with damper control levers attached to a damper switch shaft and a manual switch with normal automatic, non-automatic, open and off positions.

In the operation of such a system heretofore, the furnace drafts are controlled by the usual bi-metal tongue of the thermostat so as to pass current alternately through one active contact when more heat is needed and through another adjacent contact later, when less heat is needed. The current in both cases flows through the damper motor, thereby turning the damper control levers 180° to an opposite position, at which time the rotary contact switch member on the same shaft with the damper levers also rotates and then breaks the circuit but establishes another circuit through to the other contact which at that time is not yet in actual contact with the bimetal tongue of the thermostat, located one or more floors above, but nevertheless this contact is now connected in the circuit and therefore is ready to receive and pass a current through to the damper control motor when such contact is made, which will thereupon again reverse the position of the dampers back to the position they were in at the start of the cycle.

Figures 2, 3:
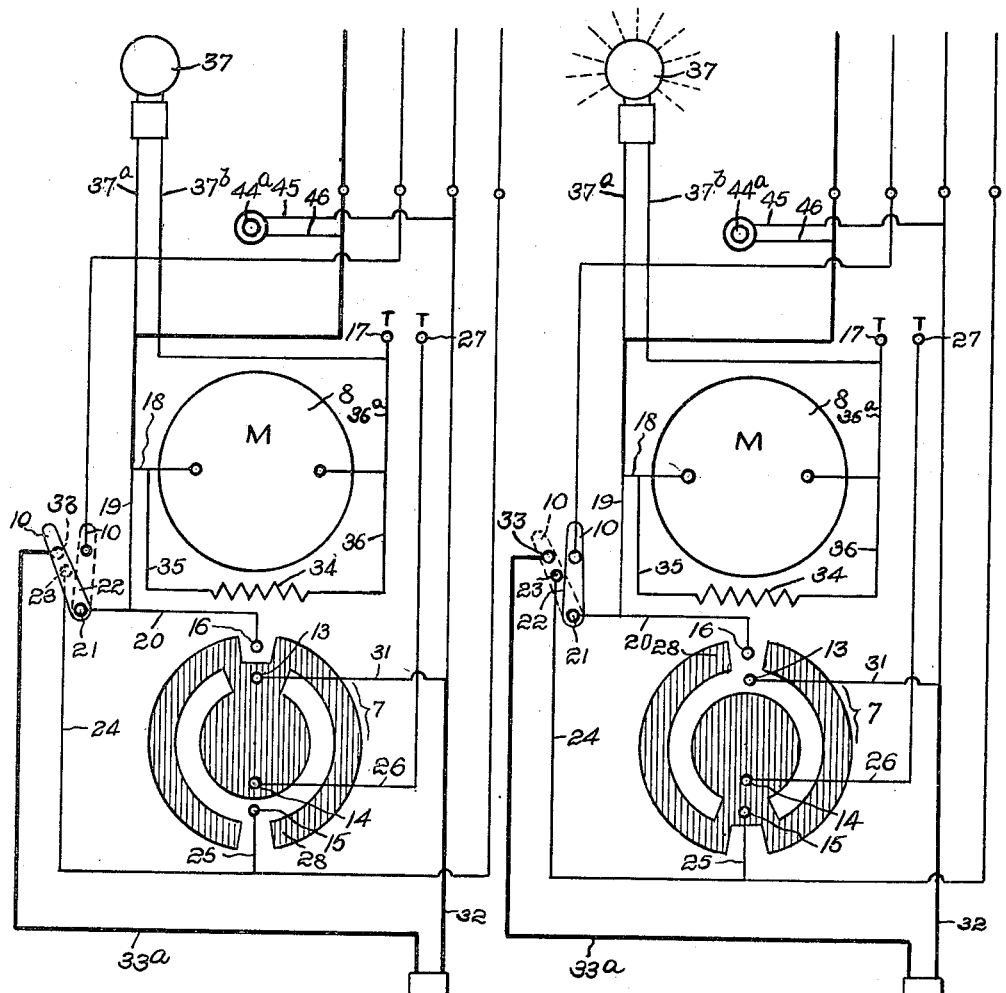
Fig. 2 is a diagram showing the various circuits, and motor and rotary contact switch in the non-automatic position but with the manual control switch in the open position, just after the rotary contact switch has reversed its position and stopped.
Fig. 3 is a similar diagram showing the position of the same parts but in the closed automatic position.

The foregoing is the usual operation of most automatic furnace draft controls and is characterized by the use of a three-wire circuit between the thermostat and the damper control motor unit in the cellar adjacent or over the furnace, such usual three-wire circuit being indicated by lighter lines in Figs. 2 and 3, the wiring of which electrical circuit will be fully described at a subsequent point.

Prior to my herein disclosed invention a single tell-tale or signal light has been used on the thermostat for the purpose of notifying the occupants of the dwelling in a room of which the thermostat is located, when the thermostat is calling for more heat and when, therefore, the dampers of the furnace are accordingly opened in response to the normal thermostatic control. Such a tell-tale or signal light is of considerable advantage for this purpose as it informs the occupants of the fact that additional coal is being burned and gives the occupants the opportunity to turn down the temperature control lever if, as a matter of fact, less heat is needed, or in other instances to go down into the cellar and supply more fuel to the furnace if the heat called for by the thermostat does not actually materialize.

I will now set forth the limitations of the present signal light or thermostat, but lacking my invention.

While such a signal light functions very well while the heat control system is operating automatically, it does not and cannot function at all when one of the occupants opens the furnace draft manually while firing or shaking the furnace, in order to prevent gas getting out, and preliminarily to the performance of such act turns the damper motor switch, hereinafter specifically referred to, from its normal or closed automatic position, as shown in Fig. 3, to the non-automatic or open position shown in Fig. 2. If, as frequently happens, the person firing the furnace then forgets to close the furnace dampers by returning the damper motor switch to the normal position shown in Fig. 3, the furnace will remain continually open and none of the occupants will be aware of this fact until the house becomes noticeably overheated. This is due to the fact that the said signal light on the thermostat cannot warn of this potentially dangerous condition. If someone continues to remain in the house while the furnace thus remains open, the result will be only a considerable waste of fuel and the discomfort of an overheated house for a few hours, but if all the occupants happen to go off for the day or the evening, and the furnace is well stoked with fuel, there is considerable danger that the house may catch fire because of the fact that the furnace would then become greatly overheated, if left open very long.

The first feature or object of my invention therefore provides simple and very inexpensive means whereby this same signal light on the thermostat will not be limited in its action, but will perform the additional function of warning, also, whenever the drafts have been opened for firing by means of turning the manual control switch to its non-automatic open position, particularly in cases where someone has forgotten to restore the said switch to its automatic position after finishing firing. This feature also causes the signal light to continue operating irrespective of the setting of the thermostat, or any manipulation of the same, until someone goes down and restores the manual switch to its automatic or normal position.

To accomplish these results, I have provided an additional or fourth wire to the circuit between the thermostat and the damper control unit, as shown by the heavier line marked G in Figs. 2 and 3, and forming a new circuit from the signal bulb to one terminal of the motor, as hereinafter more specifically described.

The second simple and very inexpensive feature of my invention provides a dual-purpose signal and utility light 12, preferably mounted on the damper motor unit, as shown in Figs. 1, 2, 3 and 4, which operates only after the manual switch, to be specifically referred to, has been turned to the non-automatic position to prevent gas getting out during firing and only after the dampers are fully open. Since this light will continue to operate as a warning signal until the switch is restored to normal or closed position, the danger of forgetting to close the dampers is practically eliminated. However, since the thermostat signal light is, as already mentioned, now capable of operating as a warning signal at the same time, those in the house will certainly soon realize the drafts have been forgotten. This double check, therefore, eliminates the danger of overheating or fire due to forgetfulness, without adding any complicated mechanism or materially adding to the cost of manufacture.

Entirely aside from its value as a reminder or signal light, is its secondary value as a source of illumination while firing at night, since most regular cellar lights are controlled by a single switch located upstairs. As already mentioned, this light saves the necessity of going up again to turn on the switch when it has been forgotten before starting on the first trip down.

It is also very convenient as a source of illumination when a person, wishing to fire the furnace, comes directly into the cellar from the outside, without going upstairs in order to turn on the cellar light switch. When firing the furnace at night, it again saves the necessity of someone going back to turn off the regular cellar switch when wishing to go direct to the street or garage.

If, however, the furnace drafts are already opened, due to normal thermostatic control, such signal and utility light will then operate just as soon as the damper motor switch is turned, without the lapse of any time whatsoever, and this will then also insure that the drafts cannot automatically close during the stoking. The addition of such dual-purpose warning and utility light to the damper control unit requires only the addition of another contact on the manual switch, shown in Figs. 2 and 3, and also the addition of another circuit from said contact through said light and through the rotary contact switch back to the other terminal of the transformer low-voltage supply source.

Such warning and utility light, adjacent or over the furnace, in addition to reminding the one tending the furnace that the drafts thereof are open so that he will not forget to close them, serves also as a convenient supplementary source of illumination while firing.

If, as already mentioned, the dual-purpose light is also to be used for the purpose of illuminating the vicinity of the furnace, while firing, upon turning the manual switch, it will take about three-quarters of a minute before the dampers are fully open and consequently before this light starts to operate. After completing the firing and upon restoring the switch to its normal automatic position, this light will instantly cease to operate and cannot therefore assist in lighting the way out of the cellar at night.

The third feature and object of my invention, therefore, provides additional, simple and inexpensive but optional means for overcoming both of these slight inconveniences, while at the same time affording certain other advantages which I will later describe. This improvement consists in using another, or second, dual-purpose light 37 wired in parallel with the damper motor, which will instantly start furnishing illumination as soon as the referred to manual switch is turned to its non-automatic, open position, for firing purposes, while the damper motor is opening the drafts, which light will stop operating as soon as the operation is completed and the light 12 (shown at the bottom of Figs. 2 and 3) consequently has started to operate. When the firing is completed and the manual switch has been turned back to its normal automatic position, the light 37 will again operate during the time the damper motor takes to close the drafts, or approximately for another three-quarters of a minute, while the damper motor unit is restoring the drafts to their closed position, thereby furnishing illumination long enough for one to leave the cellar before it is automatically extinguished.

The use of this additional dual-purpose light 37 affords other advantages. In case the damper motor stalls due to lack of oil or mechanical trouble, this light 37 would remain lighted continuously as a warning for someone to shut off the power by means of the manual switch.

Another use of this light 37 is described in connection with the fourth feature of my invention next to be referred to.

Referring to the fourth feature of my invention, those who are familiar with automatic controls realize that the bi-metal thermostatic tongue moves against one of the adjoining contacts to open the drafts and that this circuit is then automatically broken, and a circuit is formed through to the other contact which, upon the bi-metal tongue contacting it due to the action of the heat, causes a current to pass and thereby to reverse and close the drafts again. Also it is evident that these contacts must be spaced substantially apart to prevent trouble. This means the temperature will usually have to change two and a half to three or more degrees before the drafts will again change. This lag is often still further increased because of the time it takes for the warmer air to reach and then actually to effect the thermostatic element.

Most of the time this may not be of sufficient importance to bother about. However, there are times when, due to individual requirements, personal comfort, outside changing temperatures or immediate plans, it may be highly desirable to project one's individual judgment into the situation and to hurry up the process or, without resetting or disturbing the temperature control lever of the thermostat to provide for obtaining slightly more heat or slightly less heat. For instance, after a person has been outdoors on a cold day, he may wish, immediately upon entering the house, to have just a little more heat than usual, or perhaps to obtain that heat a little sooner than would ordinarily be the case if the situation were left entirely to the automatic thermostatic control. Sometimes an opposite situation arises, as when the signal light upon the thermostat shows that the furnace drafts are still open, yet, as a matter of fact, it is fast getting warmer outside and the burning of further fuel is not really necessary. Also it may frequently happen that all the occupants of the house or apartment are going out for the evening and the signal light upon the thermostat indicates that the furnace drafts are still open, when, as a matter of fact, good judgment, considering the immediate family plans, would require that the furnace drafts be closed without further delay.

In order to carry out this fourth feature or purpose of my invention, I provide the thermostat with a simple and inexpensive manually-operable push-button or equivalent member projecting out from the thermostatic housing, which push-button or member (as shown in Figs. 7 and 8) is normally held from making contact by a suitable open coil spring. I also attach to the bi-metal tongue of the thermostat an additional transversely extending contact member adapted, when moved inward by the said push-button, to make contact with both of two additional supplementary thermostat contacts, as will be more fully explained in the detailed description of the construction shown in Figs. 7 and 8.

By the referred to construction, the thermostat is capable not only of making the usual contact through the bi-metal tongue, by movement thereof to the right or to the left, but through the agency of the push-button and the transversely extending contact; additional contacts are also made through the inward movement of the said contact that is controlled by the push-button.

If, when one of the house occupants pushes the button or member, the actual temperature in the room is, as a matter of fact, just a little too low or just a little too high, the result will be to reverse the position of the furnace drafts, so that the temperature in the room will be adjusted without delay; that is, without waiting further for the bi-metal tongue of the thermostat to move responsively to temperature requirements and thus to change the furnace drafts. However, if, when the said person pushes the button, the temperature in the room is, as a matter of fact, not actually too high or too low for the position or degree to which the thermostat is set, the thermostat will not accept the order conveyed or imparted by such inward movement of the push-button, but will simply reverse the furnace drafts, and then immediately thereafter return them to their former position by making a full 360° turn.

A further advantage of this fourth feature of my invention is that it is no longer necessary actually to change the setting of a thermostat temperature control lever during the day or evening, for the desired slight variation in the temperatures of the room or rooms may be accomplished by the described manipulation of the push-button. This feature of my invention thereby eliminates the usual necessity of remembering and of later returning manually the temperature control lever of the thermostat to its former normal position after it has been temporarily turned in one direction or the other to obtain more heat or to reduce the heat.

The fourth feature of my invention also combines with the second and third features thereof to provide and make available a fifth feature, namely, the provision of means for signaling from the thermostat to the person doing the firing. This is very convenient for calling such person when wanted upstairs to answer the telephone or in case of callers. It operates as follows. Whenever the button on the thermostat is touched intermittently for an instant at a time while the furnace is being fired, a very conspicuous signal will be given by the dual-purpose light on the damper motor unit in the cellar. The lights will alternate, one light going out as the other flashes on. Even if only the lower light hereinafter identified as 12 is provided, a very conspicuous signal will be available for such use.

Figure 1:
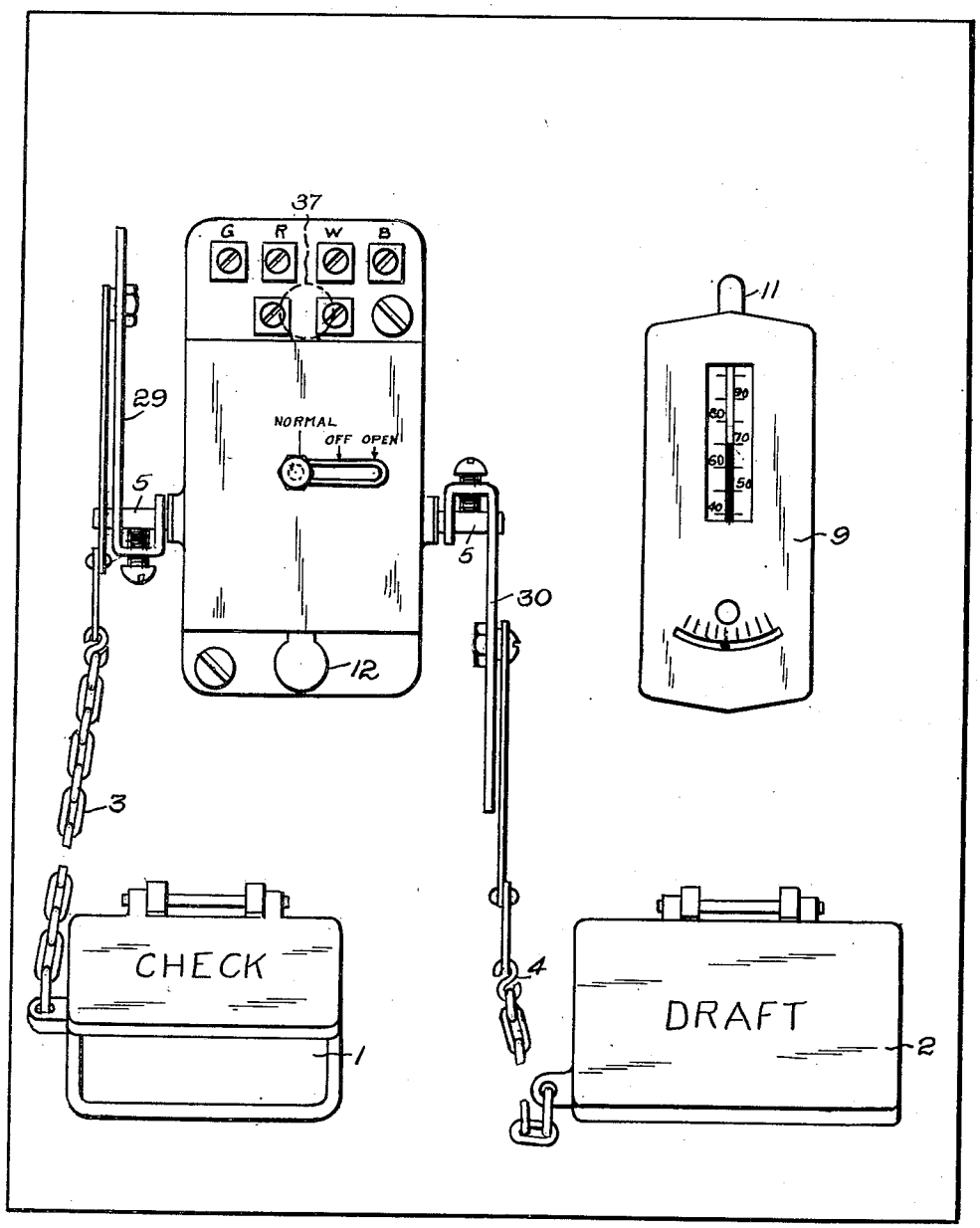

Referring more particularly to the drawings, and first to Fig. 1, the two dampers of the furnace marked "Check" and "Draft" are indicated at 1 and 2 respectively. The said dampers are connected preferably by chains indicated at 3 and 4 to a shaft 5, whereon is fast a gear 6 that itself is fast with a rotary contact switch member, indicated diagrammatically at 7 in Figs. 2 and 3 and also indicated in dotted lines in Fig. 4. The said rotary contact switch member is connected by gearing, indicated generally in Fig. 4, which need not be specifically described, with a small electric motor, indicated diagrammatically at 8 in Figs. 2 and 3 and also there bearing the letter M. The said motor is preferably one requiring only about one and a quarter amperes at eighteen volts, the current being usually supplied by a low voltage transformer, and it receives current as indicated in the diagrammatic views, Figs. 2 and 3, as will next be described, it being noted that the thermostat, while indicated at 9 in Fig. 1, is actually located in a room on a floor above the cellar in which is the furnace.

Fig. 3, with manual switch indicated at 10 in full line position, and with light hereinafter identified as 37 not considered to be operating, shows the thermostatic control system at rest in automatic closed position. Fig. 3, with the said manual switch 10 in dotted line position, and with the said light hereinafter identified as 37 in operation as indicated, shows the thermostatic control system at the precise instant when the manual control switch 10 has been turned to its non-automatic or manual open position but before the motor 8 has had time to reverse the position of the rotary switch 7 or actually to open the dampers. Fig. 2, with manual switch 10 in full line position, shows the thermostatic control system after the motor 8 has reversed the position of the rotary switch 7, with the dampers (not there shown) open, the said light 37 no longer operating but with signal lights 11 and 12, next to be described, operating as indicated. Fig. 2, with the manual switch 10 in dotted line position, and with the said light 37 considered to be operating, and with said lights 11 and 12 considered not to be operating, shows the conditions at the precise moment when the manual control switch 10 has been restored to its original automatic closed position, as first described, but before the motor 8 has had time to restore the rotary switch 7 to its original position or actually to close the dampers. Within about forty-five seconds, however, conditions will be exactly the same as first described.

In both of said diagrammatic Figs. 2 and 3, the more lightly drawn lines indicate the prior art construction respecting the electrical circuits, and therein three of the wires are marked respectively R, W and B, for red, white and blue, being so characterized in the trade. The wire marked G, represented by a heavier line is provided by me in the carrying out of the purposes of my invention.

Ordinarily this fourth wire G, instead of going down to the damper control motor 8, as herein shown, is simply wired directly into the wire R at the thermostat, and under these conditions the light on the thermostat acts as a signal only when the drafts are open due to normal automatic control, but cannot indicate when the drafts are open due to the manual switch 10 being left open. This improvement therefore makes it possible for the signal light at the thermostat to perform a new and additional duty, namely, that of warning the occupants that the drafts in the furnace have been left manually open and that the automatic system is not working.

Fig. 3, as stated, shows the normal or closed automatic position of the parts, with the conditions often found before starting to fire the furnace and before opening the drafts thereof; that is to say, while the system is still operating automatically and with the thermostat 9 in closed position.

In both Figs. 2 and 3, I have, as stated, indicated at 10 the manual damper control switch. In Fig. 3, I have also represented in dotted lines the said switch 10 in the position to which it has just been moved manually, the conditions indicated in Fig. 3 being those existing at the precise moment when the said manual damper control switch 10 has been turned from its full line position (Fig. 3) to its non-automatic or open position, but before the damper motor 8 has started to turn the damper-controlling, rotary, contact-switch member 7 and the damper levers attached thereto, with light hereinafter identified as 37 operating as indicated by dotted lines of radiation.

Fig. 2 shows the manual damper control switch 10 in solid lines, it having been moved into that position, which is the dotted line position thereof in Fig. 3. Therefore, Fig. 2 shows the condition after the damper motor 8 has had time to turn the rotary contact switch member 7 and the damper levers 180°, thereby opening the drafts to the furnace and causing the operation of the signal light indicated at 11 on the thermostat in a room above as well as the dual-purpose light indicated at 12 adjacent the furnace. Said lights 11 and 12 therefore act as warnings that the drafts of the furnace are open and should be closed.

An important purpose of the rotary contact switch member 7 is to insure that after the contact has been made through the thermostat 9 and after it has made a 180° turn, that particular circuit will be broken and the motor 8 will stop at that point, and the opposite contact point of the thermostat 9 will then be connected to the circuit through the rotary contact switch member 7 and ready to accept the next order and again to turn the rotary contact switch member 7 and connected furnace controls 180° back to its former position. In other words, there is never more than one circuit connected at a time to one side contact of the thermostat 9, and in no case can circuits be formed through both contacts of the thermostat 9 at the same time.

It may be noted that with the usual fractional horsepower damper motor, such as indicated at 8 in Fig. 3, about three-quarters of a minute is required after the manual damper control switch 10 has been moved manually to the full line position shown in Fig. 2, before the rotary contact switch member 8 has had time to reach the position indicated in Fig. 2, and therefore that same length of time is required to bring the said light 12 into operation.

When the thermostatic control is operating automatically, its operation is exactly the same as in thermostatic control systems now in general use, not equipped with the features of my invention.

In accordance with the operation of the thermostatic control system having the features of my invention applied thereto, the rotary contact switch member 7, which heretofore has been provided with four contacts 13, 14, 15 and 16, which contacts are connected to fingers indicated in Fig. 4 at 13a, 14a, 15a, 16a and extending from the terminals 13b, 14b, 15b, 16b, is provided with respect to the contact 13 with wiring connecting it to both said lights 11 and 12 in the circuit indicated by the wires W and 32, it being noted that the light 11 on the thermostat 9 in a room above is in the circuit having the wires W and G. Thus there are four wires G, R, W and B, all extending to the thermostat 9 whereas in the prior art construction only the wires R, W and B were employed.

Referring again to Fig. 3, when the furnace is to be fired, the draft damper thereof should first be opened and the check draft closed, or gas may get out and up into the rooms above. This manipulation of the drafts is accomplished by moving the manual damper control switch 10 from the automatically operated position, indicated by the full line position of said manual switch 10 in Fig. 3, into its non-automatic or open position indicated by the dotted lines in Fig. 3.

This turning of the manual damper control switch 10 from the full line to the dotted line position shown in Fig. 3, diverts the current away from the thermostat 9 and through a new circuit formed from the transformer supply terminal 17, through the motor 8, the wires 18, 19, 20 to the elements of the manual damper control switch 10 (that is, to the point indicated at 21 in Fig. 3), then to the point 22 indicated in dotted lines in Fig. 3, then to the usual switch contact 23, then to the wire 24, the wire 25 and the brush contact point 15 through the rotary contact switch member 7 to the brush contact point 14, then through the wire 26 back to the other transformer terminal 27.

As soon as the current goes through the just described circuit and the motor 8 turns the rotary contact switch member 7 slightly clockwise viewing Figs. 2 and 3, a second and more direct circuit is then formed as the outer band 28 of the rotary contact switch member 7 contacts with the brush member 16, thereby by-passing the manual switch 10 altogether and insuring that the rotary contact member switch 7 and its attached damper levers (not indicated in Figs. 2 and 3, but shown at 29, 30 in Fig. 1) will continue turning 180° to the opposite or open draft position as shown in Fig. 2, with the switch 10 in its full line position in said Fig. 2.

As soon as the rotary contact switch member 7 and the directly connected damper levers reach the position shown in Fig. 2, the first circuit through the contact 15, as well as the second and more direct secondary circuit last described, are broken so that the motor 8 stops operating just as the rotary contact switch member 7 and the damper levers 29, 30 have reached their open position as shown in Fig. 2.

Upon reaching the last referred to position, the dampers being now open, two new circuits are now formed, carrying very small currents and both passing from one transformer terminal 17 through the motor 8 (insufficient, however, to cause the motor to operate) and then dividing, one going up through the new wire G, indicated in heavy lines, to the thermostat signal light 11 and back through the wire W and the wire 31 to to the brush contact point 13, the rotary contact switch member 7 to the brush contact point 14, the wire 26 back to the transformer terminal 27, and thereby causing the signal light 11 on the thermostat to operate and to warn that the other drafts are left in manual open position irrespective of the position of the thermostat temperature lever setting the room above the furnace. The other circuit, after leaving the motor 8 through the wire 18, then divides and passes through the wires 19 and 20 to the switch members 21 and 23, to the new switch contact 33, and the new wire 33a, indicated in heavy lines, to the new damper motor signal and utility light 12, and then back through the new wire 32 to wire 31, and then through brush contact 13, rotary contact switch member 7, brush contact 14 and wire 26, back to the other transformer supply terminal. This causes the light 12 to remain lighted as long as the furnace drafts are open and until the warning of danger caused by the said light 12 is heeded. The said light 12, however, will never operate to show or indicate open drafts of the furnace when the furnace is controlled automatically. When the manual draft switch 10 has been forgotten by the one tending the furnace, and consequently the drafts have been left in the non-automatic or open position, not only does it supply a signal in the cellar, to warn the operator or one tending the furnace not to forget the drafts thereof, but the signal light 11 will also warn the occupants upstairs, a function not before possible with the three-wire system, and accordingly it will not only continue to operate but said light 11 cannot be put out at the thermostat no matter how the thermostat is set, until someone goes down and actually turns the manual switch 10 back to its normal or automatic control position, thereby closing the drafts and also restoring the system to its normal operation.

Upon returning the manual damper control switch 10 to the automatic position indicated in full lines in Fig. 3, the damper motor light 12 will then cease to operate and the damper motor 8 will again take all further orders direct from the thermostat 9, since the system is now in its normal or closed automatic position.

When the signal lights 11 and 12 are in operation, a small current from the signal bulbs passes through the motor 8 but not of sufficient strength to cause it to operate. The damper motor light 12, being used as a signal as well as for utility, should be of greater candle power than the upper or signal light 11. The power source is usually a low-voltage transformer. The lower light 12 adjacent the furnace should preferably not require more than about one-fifth of an ampere if the motor 8 requires one and one-quarter amperes to operate the same. Otherwise it might cause the motor 8 to turn slightly or to "crawl." In order to prevent any possible turning of the motor 8 when not desired or in order to permit the use of a bulb requiring more current than hereinbefore referred to, I optionally provide a suitable balancing resistance placed in parallel across the motor terminals, as indicated at 34, and connected by wires 35, 36, as indicated, to the wire 18 and to the wire leading to the transformer 17, or I may optionally provide another miniature light 37, hereinbefore referred to, connected by the wires 37a, 37b, to the wire G and to the wire leading to the transformer 17 respectively.

If it be desired to have the lower light 12 stronger, the amount of the said balancing resistance may be lowered or the resistance of the additional light 37 may be lowered to offset the same. If, for example, it is desired to have the light 12 one requiring one-half ampere, the resistance across the terminals of the motor 8 must be lowered sufficiently for this purpose.

As stated, in case of such resistance being needed, the miniature light, such as indicated at 37, may be provided instead, the said miniature light 37 or the resistance 34 being wired in parallel with the motor. If either the resistance 34 or the miniature light 37 is provided, the motor will not tend to crawl.

A further advantage arising from using the miniature light 37 is that it will operate immediately upon the manual moving of the manual damper control switch 10 from the full line position shown in Fig. 3 to the dotted line position shown in that figure, and said light 37 will stay on only while the rotary contact switch member 7 is making a half-turn. The lower light 12 will not come on for about three-fourths of a minute after the said manual damper control switch 10 has been turned. The said miniature light 37 will go out substantially instantly upon the stopping of the motor 8. This all happens before the lower light 12 comes on. It is possible to employ as strong a light or lamp 12 as is desired provided, as stated, it is balanced by a suitable resistance at the motor 8.

In place of the described resistance across the terminals of the motor 8 or the employment of a miniature light, such as 37, I may employ a brake acting against the rotary contact switch member 7 to prevent it from turning too readily.

It will be understood from the foregoing description that the person who has been tending the furnace in the manner described has about three-quarters of a minute while the motor 8 is still turning, in which to make use of the lower light 12 before the same goes out. This will permit him to leave the furnace room while the light is still on.

The fourth feature of my invention, already described in general terms as shown in Figs. 5, 7 and 8, will now be specifically described.

As hereinbefore stated, the purpose of this feature of my invention is to provide for manually varying the normal automatic action of the thermostat 9 when desired, in order to avoid an overrun of the heating or cooling action. For example, the signal light 11 may be operating to show that the furnace drafts are still open and yet it may be warm enough in the rooms to suit the occupants, or they may be going out or about to retire, and therefore they do not wish to have the furnace drafts remain open. In accordance with this feature of the invention, I provide first a push-button 38, shown in Figs. 7 and 8, which is normally held in its outer position by a coil spring 39 surrounding the stem thereof. Secondly, to the bi-metal tongue of the thermostat 9, as indicated at 40, I attach a transversely extending metallic contact member 41 of T-shape, which, as shown in Figs. 7 and 8, is normally spaced slightly away from the two supplementary contacts 42, 43 of the thermostat 9, and which have also the normal contacts 42a, 43a, shown in Figs. 7 and 8. Said supplementary contacts 42, 43, and the said normal contacts 42a, 43a are connected to the wires of the electrical circuit shown in the diagrammatic Figs. 2 and 3. By pressing inward the push-button 38, the inner end 44 thereof engages the contact member 41, so that the latter makes contact between both of the supplementary thermostat contacts 42, 43 and the thermostatic tongue 40.

By pushing the button 38 inward, the result is either to anticipate the closing or the opening time of the furnace drafts or to modify the temperature by about one and a half degrees to two degrees.

It will be understood that when the push-button 38 is pushed inward, the thermostat 9 will actually only accept or respond to this manual movement of the button 38 when the temperature at the thermostat 9 is such that it is nearly ready to close the drafts of the furnace or nearly ready to open said drafts. In other words, if the bi-metal tongue 40 of the thermostat 9 is not actually touching either contact 42 or 43 thereof, and the button 38 is pushed inward, contact will be made by the transversely extending contact member 41 with both supplementary contacts 42, 43 thereof, and thus with both the so-called blue and white circuits represented in Figs. 2 and 3, already described, but since only one of said circuits can at any time be connected through the rotary contact switch member 7, the current passes only through the circuit that is then connected. However, if the thermostat bi-metal element 40 is actually touching, say, the open or blue wire contact, the pushing inward of the push-button 38 will result only in causing the rotary contact switch member 7 and the draft control levers 29 and 30 to make one complete revolution, and it will then stay in its original position because the thermostat 9 is in fact still calling for heat. This means that the thermostat 9 will never accept a manual order executed by pushing the push-button 38, excepting when the bi-metal tongue 40 of the thermostat 9 is between the two normal contacts 42a, 43a of the thermostat 9 and is not actually touching either of them.

The transversely extending contact member 41, which is preferably T-shaped as shown in Figs. 7 and 8, moves when pushed inward by the push-button 38, at right angles to the normal movement of the bi-metal tongue 40 of the thermostat 9, which is from side to side. The described movement of the contact member 41 results in its making contact with both of the thermostat supplementary contacts 42, 43, but since only one of said supplementary contacts 42 or 43 is ever in the circuit at the same time, only that supplementary contact 42 or 43 of the thermostat 9 which is actually in the circuit can accept or respond to the manual order, namely, the pushing in of the button 38. Thus, the thermostat 9 instead of having only a two-way movement (namely, a movement of the bi-metal tongue to the right or left between the normal contacts 42a and 43a thereof) has a four-way movement, for after the push-button 38 is pushed, the natural spring of the thermostatic bi-metal tongue 40 restores the transversely extending contact member 41 to its open position where it is out of contact with both of the thermostat supplementary contacts 42, 43.

Let it be supposed that when coming into the house one finds the thermostat 9 set for 70°. There must be a certain amount of space between the two normal contacts 42a, 43a of the thermostat 9, and this means that there must be a leeway of at least one and a quarter degrees each side of the neutral or temperature setting position of the bi-metal tongue 40 or between it and either the contact 42a or the contact 43a, making a total of at least two and a half to three degrees between the open position and the closed position of the thermostat 9. This means that the temperature of the room could be as much as one and a quarter degrees to either side of the desired temperature (that is, above or below) before the thermostat 9 will automatically open or close the proper circuit, shown in Figs. 2 and 3. Considering the lag of action this may equal two and a half to three degrees.

In accordance with the present invention, by pushig the push-button 38, the temperature of the room may be immediately brought up or lowered one and a quarter to two and a half degrees. In other words, by pushing the push-button 38, the effect is to close the dampers of the furnace or to open the same perhaps half an hour before the damper would ordinarily close or would ordinarily open.

Prior to the present invention, if one came in from outdoors feeling chilly and temporarily like having a little more heat, he would usually turn up the thermostat 9 a few degrees and then later would have to remember to turn it down again. Otherwise the house would become somewhat overheated. With the described construction constituting the fourth feature of my invention, an earlier action is obtained, the desired heat being secured more quickly. The described construction in reality hurries up the action which ordinarily would later be obtained through the normal thermostatic action. The said construction does not in any way interfere with the normal action of the thermostat. The "order" imposed by pushing the push-button 38 stays in effect until the bi-metal thermostatic element or tongue 40 has moved enough in the opposite direction to make a contact which will reverse the position of the drafts of the furnace. The push-button may, if desired, constitute a part of the name-plate shield of the thermostat casing.

Referring to Figs. 2 and 3, as a sixth but optional feature, I have therein indicated at 44a an extra and optional push-button connected by wires 45, 46 to the main wires G and W respectively, for obtaining a short further illumination if considered necessary to cover certain special conditions, and providing the light when it is needed for utility purposes.

This push-button 44a is provided to make it possible to obtain light after the manual switch 10 has been turned to its normal automatic position, as shown in full lines in Fig. 2, and after the lower damper control light 12 has immediately gone out because the thermostat 9 happens to be calling for more heat, and is therefore, in this particular case, remaining in open position. This need for further light is also present if the thermostatic bi-metal tongue 40 of the thermostat 9 happens to be halfway between the shut and the open position. In either case the light 12 will always go out at once when the manual switch 10 is turned to its automatic position. If it is desired to cover this contingency by providing light briefly, such extra push-button 44a may be wired as indicated in Figs. 2 and 3, above the damper switch control and connected between wire G and wire W.

Upon restoring the manual damper control switch 10 to its normal position, as shown in dotted lines in Fig. 2, after the light 12 goes out, then, by pushing the push-button 44a, the result is to cause the damper control motor unit to rotate a half-turn if the thermostat 9 is in neutral position or a full turn if the thermostat 9 is in open position, and the bulb 37 will be illuminated during the period of this rotation.

Therefore the push-button 44a and the wiring connections therefor provide for at least three-quarters of a minute of illumination or one and a half minutes of illumination, either of which is ample while the person tending the furnace is leaving the cellar. However, if light is not needed for illumination purposes, the push-button 44a need not be used.

The six different features of the invention all cooperate, but nevertheless they may be used apart from each other. The entire invention is particularly applicable for use in the control of solid fuel burning furnaces, but the features thereof are not necessarily restricted thereto.

Having thus described one embodiment of the invention, it is to be understood that although specific terms are employed, they are used in a generic and descriptive sense and not for purposes of limitation, the scope of the invention being set forth in the following claims.

I claim:

1. In a thermostatic control system for furnaces of the type including a thermostat to be located in a space the temperature of which is to be controlled and comprising a thermo-responsive element, a contact arm actuated thereby and an "on" contact and an "off" contact with which said contact arm may engage alternately, and including a heat supply control means comprising an electrically actuated motor, a source of electricity therefor one side of which is directly connected to one side of said motor, a damper actuating mechanism driven by said motor and a circuit commutator actuated by said damper actuating mechanism, and including conductors leading respectively from said contact arm and each of said thermostat contacts to said heat supply control means, the combination of a lamp forming part of said thermostat, connections from one side of said lamp to said "off" contact and from the other side of said lamp to that side of said electric motor which is not directly connected to said electric source, a manual switch associated with said heat supply control means so constructed that when in normal position it completes a circuit from one side of said lamp and of said motor to the conductor which leads to the contact arm of the thermostat and when in actuated position it completes a circuit from said one side of said lamp and said side of the motor to the conductor which leads to the "on" contact of said thermostat.

2. In a thermostatic control system for furnaces of the type including a thermostat to be located in a space the temperature of which is to be controlled and comprising a thermo-responsive element, a contact arm actuated thereby and an "on" contact and an "off" contact with which said contact arm may engage alternately, and including a heat supply control means comprising an electrically actuated motor, a source of electricity therefor one side of which is directly connected to one side of said motor, a damper actuating mechanism driven by said motor, a circuit commutator actuated by said damper actuating mechanism, and including conductors leading respectively from said contact arm and each of said thermostat contacts to said heat supply control means, the combination of a lamp forming part of said thermostat, connections from one side of said lamp to said "off" contact and from the other side of said lamp to that side of said electric motor which is not directly connected to said electric source, a manual switch associated with said heat supply control means so constructed that when in normal position it completes a circuit from one side of said lamp and of said motor to the conductor which leads to the contact arm of the thermostat and when in actuated position it completes a circuit from said one side of said lamp and said side of the motor to the conductor which leads to the "on" contact of said thermostat, and a lamp forming part of said heat supply controlling device, one side of said lamp being connected to the conductor leading to the "off" contact of said thermostat and its other side being connected to a contact forming part of said manual switch so located that when the manual switch is in actuated position a circuit will be established from said contact to the "on" contact of the thermostat.

3. In a thermostatic control system for furnaces of the type including a thermostat to be located in a space the temperature of which is to be controlled and comprising a thermo-responsive element, a contact arm actuated thereby and an "on" contact and an "off" contact with which said contact arm may engage alternately, and including a heat supply control means comprising an electrically actuated motor, a source of electricity therefor one side of which is directly connected to one side of said motor, a damper actuating mechanism driven by said motor, a circuit commutator actuated by said damper actuating mechanism, and including conductors leading respectively from said contact arm and each of said thermostat contacts to said heat supply control means, the combination of a manual switch associated with said heat supply control means so constructed that when in normal position it completes a circuit from said motor to the conductor which leads to the contact arm of the thermostat and when in actuated position it completes a circuit from said side of the motor to the conductor which leads to the "on" contact of said thermostat, and a lamp forming part of said heat supply controlling device, one side of said lamp being connected to the conductor leading to the "off" contact of said thermostat and its other side being connected to a contact forming part of said manual switch so located that when the manual switch is in actuated position a circuit will be established from said contact to the "on" contact of the thermostat.

4. The combination according to claim 3 including a second lamp connected in parallel with the electric motor.

5. The combination according to claim 2, including a third lamp connected in parallel with the electric motor.

ROLAND L. SMITH.

REFERENCES CITED

The following references are of record in the file of this patent:

UNITED STATES PATENTS

| Number | Name | Date |
|---|---|---|
| 674,867 | Howe | May 28, 1901 |
| 1,931,464 | Dicke | Oct. 17, 1933 |
| 2,166,834 | Wiltshire | July 18, 1939 |
| 2,291,210 | Carlson | July 28, 1942 |
| 2,296,704 | Carlson | Sept. 22, 1942 |
| 2,300,839 | Dicke | Nov. 3, 1942 |
| 2,448,776 | Crise | Sept. 7, 1948 |